United States Patent
Spielberger

(10) Patent No.: US 8,118,123 B2
(45) Date of Patent: Feb. 21, 2012

(54) METHOD FOR THE GENERATION OF ELECTRICAL ENERGY, METHOD FOR OPERATION OF AN ELECTRICALLY-DRIVEN MOTOR VEHICLE AND DEVICE FOR GENERATION OF ELECTRICAL ENERGY AND ELECTRIC VEHICLE

(76) Inventor: Peter Spielberger, Vienna (AT)

( * ) Notice: Subject to any disclaimer, the term of this patent is extended or adjusted under 35 U.S.C. 154(b) by 363 days.

(21) Appl. No.: 12/223,419

(22) PCT Filed: Aug. 24, 2006

(86) PCT No.: PCT/AT2006/000351
§ 371 (c)(1),
(2), (4) Date: Jul. 29, 2008

(87) PCT Pub. No.: WO2007/030846
PCT Pub. Date: Mar. 22, 2007

(65) Prior Publication Data
US 2009/0033101 A1 Feb. 5, 2009

(30) Foreign Application Priority Data
Sep. 16, 2005 (AT) .................................. A 1530/2005

(51) Int. Cl.
*B60K 3/00* (2006.01)
(52) U.S. Cl. ..................................... 180/65.31; 180/310
(58) Field of Classification Search .................. 180/302, 180/303, 304, 65.31, 310
See application file for complete search history.

(56) References Cited

U.S. PATENT DOCUMENTS

| | | | | |
|---|---|---|---|---|
| 3,101,592 A * | 8/1963 | Robertson et al. | ......... | 60/39.463 |
| 3,229,462 A * | 1/1966 | Fatica | .............................. | 60/793 |
| 3,969,899 A * | 7/1976 | Nakazawa et al. | .............. | 60/670 |
| 5,191,766 A * | 3/1993 | Vines | ................................ | 60/619 |
| 5,899,072 A * | 5/1999 | Gode | ................................ | 60/670 |
| 6,255,009 B1 * | 7/2001 | Rusek et al. | .................. | 429/505 |
| 6,397,962 B1 * | 6/2002 | Bllau | ......................... | 180/65.23 |
| 6,991,772 B1 * | 1/2006 | Rusek | ......................... | 423/580.1 |
| 7,314,104 B2 * | 1/2008 | Ketcham | ...................... | 180/303 |

FOREIGN PATENT DOCUMENTS
WO    WO 02/20345    3/2002

* cited by examiner

*Primary Examiner* — Jeffrey J Restifo
(74) *Attorney, Agent, or Firm* — Bennet K. Langlotz; Langlotz Patent & Trademark Works, Inc.

(57) ABSTRACT

A process for generation of electrical power comprises the exothermic, possibly catalytic, decomposition of a medium, preferably hydrogen peroxide, with the addition of water and the use of the steam to drive a steam machine, which is connected to an electricity generator. In order to improve the process specifically for use in electrical vehicles, highly concentrated medium, preferably hydrogen peroxide, is decomposed and the steam is condensed after emerging from the steam machine, and is fed back into the process. An electrical vehicle is advantageously operated in such a way that the electrical power is generated as explained above and is fed to at least one rechargeable battery, with the electrical power for at least one electric motor being taken from the rechargeable battery.

10 Claims, 1 Drawing Sheet

Figure 1:
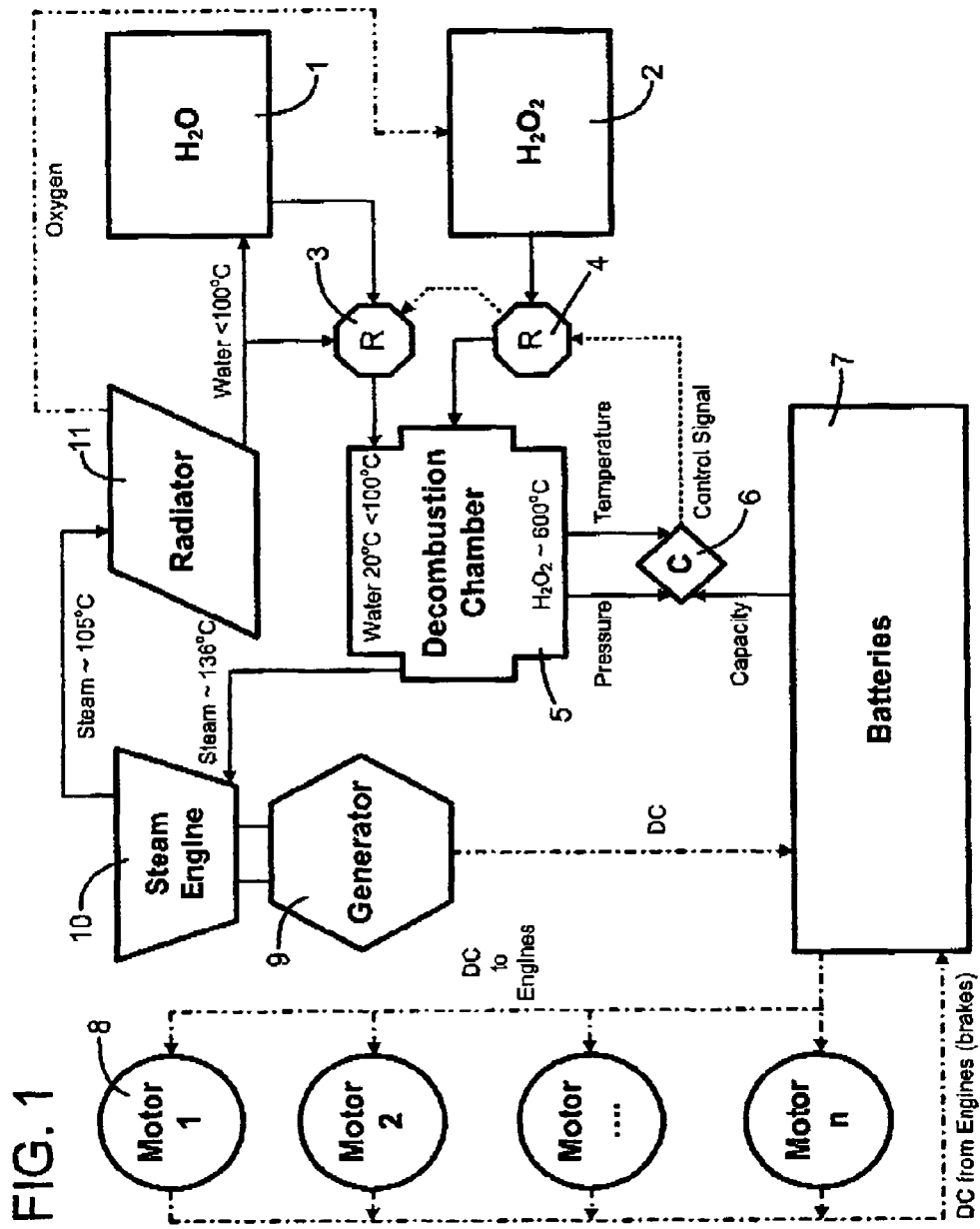

METHOD FOR THE GENERATION OF ELECTRICAL ENERGY, METHOD FOR OPERATION OF AN ELECTRICALLY-DRIVEN MOTOR VEHICLE AND DEVICE FOR GENERATION OF ELECTRICAL ENERGY AND ELECTRIC VEHICLE

CROSS-REFERENCE TO RELATED APPLICATIONS

This is a National Stage application under 35 USC 371 of PCT/AT2006/000351, filed Aug. 24, 2006, and based on Austrian Patent Application No. A 1530/2005, filed Sep. 16, 2005.

The invention relates to a process for generation of electrical power, comprising the exothermic, possibly catalytic, decomposition of a medium, preferably hydrogen peroxide, with the addition of water, with the steam which is created directly from the medium and the water being used to drive a steam machine, which is connected to an electricity generator, to a method for operation of an electrically powered motor vehicle, comprising the generation of electrical power on board the motor vehicle and this power being fed to at least one electric motor, and to an apparatus for generation of electrical power, in each case having a supply container for hydrogen peroxide and water, a decomposting or combustion chamber, possibly with a catalytic converter, for the decomposition of the hydrogen peroxide, and a steam machine which is fed from the decomposting chamber and has a generator connected to it, as well as control devices for the hydrogen peroxide to be introduced into the decomposting chamber and water, and to an electrical vehicle having at least one electric motor and at least one rechargeable battery for supplying electrical power to the electric motor.

A plurality of hybrid drives are known (diesel, electric, and petrol-electric). Furthermore a propulsion system designed by Ing. Walther for submarines and aircraft using $H_2O_2$ has been known since 1940. NASA experimented with $H_2O_2$ rockets shortly after World War II and a mixture of kerosene and $H_2O_2$ was used, in a similar manner to the Walther drive "hot version" with $H_2O_2$ and diesel. $H_2O_2$-powered torpedoes and the "James Bond rocket rucksack" now exist. However, so far, electric cars have not effectively gone beyond the "play stage" apart from the electrically powered postal package vehicles produced by Prof. F. Porsche in the period after the war.

In comparison to internal combustion engines, electrical propulsion has the advantages firstly of freedom from exhaust gas and secondly that the torque characteristic is virtually the reverse of that of internal combustion engines (internal combustion engines generally produce their maximum torque in a rotation speed range above 2500 rpm, while electric motors produce their maximum torque in the lowest rotation speed range). However, electrical propulsion systems at the moment are subject to the problem of short range, unless the required electrical power is generated just at the moment when it is consumed. The latter is the declared aim of propulsion by means of a fuel cell and hydrogen.

However, one problem in this case is that hydrogen must either be kept cool to minus 256° C. (that is to say the hydrogen cooling must continue to run even when the vehicle is not being used) or the hydrogen would have to be kept in liquid form at very high pressure. Both situations would very highly probably lead to a major jam in the event of a road traffic accident. Although the currently held opinion that the oxyhydrogen gas created from hydrogen and oxygen would evaporate is incorrect, even the ban on motor vehicles which are powered by liquid gas in virtually all underground garages and/or tunnels in fact carries hydrogen theory to an absurd level.

A simple steam piston machine which is operated, for example, with $H_2O_2$ and an additional liquid, for example $H_2O$, is disclosed in U.S. Pat. No. 6,250,078 B. In this case, the remaining energy is simply ejected. This drive is unsuitable for operation of a motor vehicle since, for example, about 120 kg of $H_2O_2$ would have to be "burnt" every hour for a desired power of 75 HP on the drive shaft, because a corresponding amount of power must always be available in the "steam boiler" and the power to be emitted cannot be controlled via the "heating" since this would be too difficult (the reaction time would be much too long).

Exothermic decomposition of $H_2O_2$ also takes place in the power generation installation according to GB 1 292 046 A where, however, water is supplied from the outside and will therefore always be at the ambient temperature. However, emission of thermal energy to the environment should be avoided as far as possible in order to consume as little $H_2O_2$ as possible. Furthermore, according to GB 1 292 046 A, a turbine is driven. However, this also requires correspondingly more steam than a piston machine and produces an appropriately acceptable efficiency only in high rotation speed ranges (gap losses). A very high rotation speed is in turn counterproductive for operation of generators (in particular if they are intended to be kept small), that is to say an appropriate gearbox must be connected in between, which then very quickly reaches the limits of what is feasible in terms of toothed systems, however. In addition, the starting and end phases are correspondingly long, during which the turbine is not at a constant rotation speed as required for operation of the generator, and this once again results in correspondingly high consumption of hydrogen peroxide.

U.S. Pat. No. 6,282,900 B1 discloses an installation in which carbide and water are decomposed to produce acetylene in a reactor, after which the acetylene is burnt and is used to generate steam from water. The steam which is created in the steam machine, which is in the form of a turbine, in the circuit, which is completely separate from the carbide-water reaction, is fed back again after condensation. The exothermic decomposition of the carbide with the reaction water is used to preheat the water in the steam circuit.

DE 34 04 090 A1 describes a steam motor in which iron oxide and coke react with one another and in which their reaction heat then causes water to vaporize, with this steam as well as the carbon dioxide that is created driving a steam piston machine. This is therefore a steam machine with active combustion above 1000° C. ignited by means of arcs, in a similar manner to the thermite welding process for welding railroad rails. This results in solid residues that have to be disposed of and which, furthermore, behave in a similar manner to grinding agents on a grinding wheel, thus drastically shortening the life of a machine that is driven in this way. The "feedwater" is preheated by passing the waste steam out of the steam machine. The energy that is recovered (during braking etc.) is stored in heat rods which are surrounded by material that stores heat. Within a short time, these heat rods will therefore have reached a temperature which causes the sheathing together with the heat rods to melt.

The object of the present invention was therefore to specify an electricity generation process which is suitable for use in electrical vehicles and an optimized method for operation of a vehicle such as this. A further aim of the invention was an apparatus for generation of electrical power, in particular for installation in electrical vehicles, as well as an electrical vehicle whose design is better than conventional designs.

In order to solve the stated problem, the process described initially is distinguished in that highly concentrated medium, preferably hydrogen peroxide, is decomposed and the steam is condensed after emerging from the steam machine, and is fed back into the process. The closed water circuit according to the invention with a limited and essentially invariable amount of water, typically about 60 kg, in the $H_2O$ tank on the one hand ensures independence from an external water supply while also providing the capability to process this water to the optimum temperature for the process.

In this case, the condensed steam is advantageously added to the exothermic decomposition of the medium thus resulting in a circuit which operates with very low losses.

According to one advantageous embodiment of the invention, the energy content of the steam after it emerges from the steam machine is used to preheat the water. This also keeps the energy losses as low as possible, and thermal energy which cannot be used for electricity generation is still made sensible use of in the process.

A further advantage in the sense of a circuit which is as closed as possible and which requires the minimum possible external supply is by feeding oxygen which is created during the decomposition of the medium back into the process.

In one particularly advantageous embodiment of the invention, hydrogen peroxide with a concentration of at least about 70%, and preferably of at least about 80% is decomposed. When $H_2O_2$ is decomposted with a saturation of more than 70%, and is prevented from expanding without any constraint at the same time, temperatures of more than 600° C. are reached suddenly in some circumstances. This allows the addition of the stoichiometrically correct amount of water, in which case the steam created during this process can then be used to generate further power, with the majority of its energy being emitted in the form of hydrodynamic and thermodynamic work.

The steam is advantageously passed to a steam piston machine in this case, and in particular to a correspondingly slowly running piston machine, whose torque is more or less constant and is not dependent on the rotation speed. Steam piston machines furthermore have the advantage that they have a very high efficiency when running slowly and can be flange-connected directly to the generator so that there is no need for an intermediate gearbox.

The method described initially for operation of an electrically powered motor vehicle solves the problem by generating the electrical power in accordance with one of the preceding paragraphs and feeding to at least one rechargeable battery, with the electrical power for at least one electric motor being taken from the rechargeable battery. The vehicle operation is optimized because of the decoupling of the electricity generation and the supply for the electric motor or all of the electric motors. By way of example, a generator with a power consumption of about 25 HP is sufficient to supply a total electric motor power of about 75 HP since, in fact, it just has to charge the rechargeable batteries constantly. 75 HP can always be drawn from the rechargeable batteries for a short period (for acceleration or for travelling uphill)—they then just become "empty" more quickly. During braking or when driving downhill, the electric motors to a greater or lesser extent feed the "additional current" drawn during acceleration or when travelling uphill back into the rechargeable batteries again, since, in fact, electric motors can also be used reciprocally as generators. In addition to this, the rechargeable batteries in the vehicle could in fact be charged by connecting them to a plug socket in a garage—if modern electric cars have sufficient energy in the rechargeable batteries for about two hours, a driving time of about six hours should be achievable with about 70 kg of $H_2O_2$ on board thus allowing an electric car also to be useful for daily practical use.

The apparatus explained initially for generation of electrical power is, in order to achieve the stated aim according to the invention, distinguished in that the steam machine is in the form of a steam piston machine and that a line for the expanded steam leads to a cooling and condensation device whose outlet is connected to the control device for the addition of water. Feeding back the steam and the water circuit that is thus closed mean that it is either possible to avoid an external water supply, or such a water supply is greatly restricted. The process per se results in the advantages that the water which is circulating in the process can be raised by the thermal energy that is generated to the optimum temperature for the process. The use of a steam piston machine with its more or less constant torque which is not dependent on the rotation speed leads to very high efficiency, particularly during slow operation, and this is also contributed to by the fact that an intermediate gearbox, which would reduce the efficiency, can be avoided by the capability for direct flange connection to the generator.

The invention advantageously provides that the outlet from the cooling and condensation device is also connected to the supply container for water so that water which has not been consumed at any given time is not lost either, but is kept available in the tank for further use.

If, according to a further embodiment of the invention, the outlet from the cooling and condensation device for gaseous oxygen is connected to the supply container for the medium, this further extends the advantages of the autonomous system which has as little adverse effect as possible on the environment.

The efficiency of the apparatus can be increased, with design simplification at the same time, by the crankshaft of the steam piston machine driving the generator directly, or continuing as the drive shaft of the generator.

In an electrical vehicle having at least one electric motor and at least one rechargeable battery for supplying electrical power to the electric motor, the stated aim according to the invention is distinguished in that an apparatus for generation of electrical power as claimed in one of the preceding paragraphs is provided, and is connected solely to the at least one rechargeable battery, in order to charge it. The electricity generation is therefore decoupled from the supply to the electric motor or to all of the electric motors, and each area can be optimized in its own right. Furthermore, the power generation system need not supply a current for the electric motors directly, so the control process is also considerably simpler, and just has to constantly charge the rechargeable batteries.

The invention will be explained in more detail in the following description with reference to the attached figure, which shows a schematic illustration of the power generation system as far as the electric motors in an electrical vehicle.

A medium which decomposes exothermically, possibly catalytically, and is preferably high-test $H_2O_2$ (preferably with a saturation of more than 70%) is injected into a combustion or decomposting chamber 5 from a tank 2 via a regulator 4. In certain conditions (catalytic converter, for example vapor-deposited platinum, or else a sufficiently high temperature) this $H_2O_2$ decomposts since in this case it is in the form of an unstable solution, into $H_2O$ and O. During this decomposition process, energy is released, in some circumstances suddenly, in the form of heat, if the reaction products are at the same time prevented from being able to expand without restrictions. This allows temperatures of more than 600° C. to be achieved. The hydrogen peroxide may also, of course, be used in other forms, for example in powder or tablet form, and can be brought into contact with water after being introduced into the decomposting chamber 5, for example by means of a screw feed.

When the stoichiometrically correct amount of $H_2O$ is added from the tank 1 via the regulator 3, saturated steam is produced at a temperature of about 136° C., which preferably drives a steam piston machine 10 and in the process emits the majority of its energy in the form of hydrodynamic and thermodynamic work.

After this, the steam will preferably be at a residual temperature of about 105° C. at normal pressure, and is then cooled down in the cooler 11, preferably to below 100° C. Depending on the requirement, the condensed water is emitted to the tank 1 and the oxygen created during the decomposition of the hydrogen peroxide is emitted to the tank 2 for the $H_2O_2$ and/or is once again injected into the combustion and decomposting chamber 5 via the respective regulators 3 and 4. Firstly, the $H_2O_2$ tank 2 does not have to receive air from the outside and, secondly, the oxygen that is produced is stored and can be emitted during replenishment with $H_2O_2$, and can be used for other purposes. Excess water vapor and excess oxygen can be blown out into the atmosphere without any damaging side effects. Because of the high temperature of the water, less $H_2O_2$ with a decomposting capability need be injected during the process and in turn converted to saturated water vapor.

In order to operate a steam piston machine 10 at about 25 HP, about 250 kg of saturated water vapor is required at about 140° C. per hour. On the output side this steam will still be more than 105° C. A reduced pressure is also produced on the piston output side during cooling down in the cooler 11 to below 100° C. The water in the $H_2O$ tank 1 can also advantageously be heated by the thermal energy from the expanded steam so that it can be injected into the decomposting chamber 5 at about 95° C., and can be added to the hydrogen peroxide. Far less $H_2O_2$ (comparatively only 37.5% of the conventional amount) is therefore necessary according to the invention for the same amount of steam as in conventional processes as can be seen from the following table.

| $H_2O_2$ Consumption for 250 kg of saturated steam at about 140° C. | | | | | |
|---|---|---|---|---|---|
| $H_2O_2$ [kg] | Decomposition temperature [C. °] | Steam 140° C. [kg] | $H_2O$ 20° C. [kg] | $H_2O$ 95° C. [kg] | $H_2O_2$ Consumption/ Hour [kg] |
| 1.00 | 700.00 | 5.83 | 4.83 | | 42.86 |
| 1.00 | 700.00 | 15.56 | | 14.56 | 16.07 |

The power required, for example, to operate an electrical vehicle is generated by means of at least one generator 9 which is operated directly, that is to say flange-connected directly without an intermediate gearbox, by the steam piston machine 10. This steam piston machine 10 has a constant torque characteristic and is operated at a low, preferably also constant, rotation speed for the generators 9, and this is in turn advantageous for operation of a generator (9). Furthermore, the steam machine can be optimally designed for precisely this rotation speed range. The electrical power generated by the generators 9 is stored in rechargeable batteries 7 from which the electric motor or motors 8, which represent the sole propulsion system for the vehicle, are fed. This is advantageous because batteries can emit extremely high power levels for a short time.

Assuming that the rechargeable batteries 7 are completely charged, the method of operation on starting up a vehicle with the propulsion system according to the invention could be described as follows. On starting, the propulsion system is started up by turning a switch and/or operating a control resistor. During this process, a preferably electronic monitoring unit 6 monitors the state of charge of the batteries 7. If this state of charge falls below a predefined value, the steam machine 10 is started up by injecting $H_2O_2$ from the tank 2 via the regulator 4 into the combustion/decomposting chamber 5. This monitoring unit 6 monitors the pressure and temperature in the combustion/decomposting chamber 5 and controls the injection of $H_2O_2$ from the tank 2 via the regulator 4 and/or $H_2O$ from the tank 1 via the regulator 3 to produce the correct ratio. If the temperature rises too high, more $H_2O$ is correspondingly injected.

The invention also results in an advantage in terms of material because high temperatures, such as those which occur in internal combustion engines, can be entirely avoided. This makes it possible to use materials which are not resistant to high temperatures (stainless steel, duraluminum, ceramic and polymers). Furthermore, the invention results in the advantage that the greatest possible proportion of the thermal energy is converted to work rather than, as in the case of internal combustion engines, the majority of the thermal energy having to be lost by cooling. All the components are, of course, preferably designed in a thermally-insulated form.

As soon as the batteries 7 have been fully charged by the generator 9—or by current fed back from the motors 8 from braking or deceleration energy—the chain reaction which is controlled by deliberate injection of $H_2O$ via the regulator 3 is stopped, by stopping the supply of $H_2O_2$ through the regulator 4. According to the invention, this achieves independence from external electrical charging sources although, of course, this does not preclude the capability to charge the batteries 7 from external sources. A further advantage of the invention is that, in the event of an accident, $H_2O_2$ will admittedly emerge into the environment and in some circumstances will start to decompost itself owing to the natural presence of catalysts (chlorophyll, rust, platinum, high-purity silver, blood and so on), but only temperatures around 60° C. will be reached owing to the free expansion, and in this case unconstrained expansion capability for the $H_2O_2$.

If the state of charge of the batteries 7 falls below the predefined state because of consumption by the motors 8 or other accessories (lights etc.), the monitoring unit 6 will start the "charging process" again. According to the invention, this also results in the advantage that this can still be done when the motors 8 are not being operated. The charging process can be additionally assisted by solar elements.

The invention claimed is:
1. A process for generation of electrical power comprising the steps of:
   storing a supply of hydrogen peroxide;
   storing a supply of water separately from the hydrogen peroxide;
   generating a mixture of hydrogen peroxide and water by transmitting a portion of the supply of hydrogen peroxide and a portion of the supply of water to a common receptacle;
   decomposing the hydrogen peroxide and water mixture in an exothermic reaction to produce saturated steam and oxygen;

driving a steam machine by transmitting the steam and oxygen to the steam machine, the steam machine driving an electricity generator;

condensing the steam after the steam has been used to drive the steam machine and emerges from the steam machine; and heating the quantity of water with the condensed steam before the water is mixed with the hydrogen peroxide.

2. The process of claim 1, wherein the condensed steam is cooled to a temperature below 100° C. prior to heating the quantity of water.

3. The process of claim 1, further comprising the steps of:

separating the oxygen from the condensed steam prior to heating the quantity of water with the condensed steam to; and mixing the oxygen with the quantity of hydrogen peroxide.

4. The process of claim 1, wherein the quantity of hydrogen peroxide has a concentration of less than 85%.

5. The process of claim 3, wherein the quantity of hydrogen peroxide has a concentration of at least about 70%.

6. The process of claim 1, wherein the steam machine is a steam piston machine.

7. The process of claim 1, wherein the quantity of water is a stoichiometrically determined amount to produce saturated steam at a temperature of about 136° C. once the hydrogen peroxide has decomposed.

8. The process of claim 1, wherein the quantity of water is heated to about 95° C.

9. The process of claim 1, wherein the hydrogen peroxide decomposes as a result of at least one of the group consisting of being exposed to a catalyst and being raised to a sufficiently high temperature to spontaneously decompose.

10. A method for operation of an electrically powered motor vehicle comprising the steps of:

storing a supply of hydrogen peroxide;

storing a supply of water separately from the hydrogen peroxide;

generating a mixture of hydrogen peroxide and water by transmitting a portion of the supply of hydrogen peroxide and a portion of the supply of water to a common receptacle;

decomposing the hydrogen peroxide and water mixture in an exothermic reaction to produce saturated steam and oxygen;

drive a steam machine by transmitting the steam and oxygen to the steam machine, the steam machine driving an electricity generator;

storing electricity generated by the electricity generator in a rechargeable battery;

driving an electric motor using the electricity stored in the rechargeable battery;

condensing the steam after the steam has been used to drive the steam machine and emerges from the steam machine; and heating the quantity of water with the condensed steam before the water is mixed with the hydrogen peroxide.

* * * * *